(12) United States Patent
Kim

(10) Patent No.: US 8,041,408 B2
(45) Date of Patent: Oct. 18, 2011

(54) BATTERY FASTENING APPARATUS AND PORTABLE TERMINAL USING THE SAME

(75) Inventor: Woo Jin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1525 days.

(21) Appl. No.: 11/453,044

(22) Filed: Jun. 15, 2006

(65) Prior Publication Data

US 2006/0287013 A1   Dec. 21, 2006

(30) Foreign Application Priority Data

Jun. 16, 2005   (KR) .......................... 10-2005-0052070

(51) Int. Cl.
*H04M 1/00* (2006.01)

(52) U.S. Cl. ................. 455/575.8; 455/41.2; 455/575.1; 361/616; 361/679.01

(58) Field of Classification Search ................. 455/41.2, 455/575.1, 575.3, 575.4, 575.8; 361/616, 361/679.01
See application file for complete search history.

(56) References Cited

U.S. PATENT DOCUMENTS

| 7,043,282 B2 * | 5/2006 | Inomata et al. ............ 455/575.1 |
| 7,346,366 B2 * | 3/2008 | Park .......................... 455/550.1 |

* cited by examiner

*Primary Examiner* — Tuan H Nguyen
(74) *Attorney, Agent, or Firm* — Birch, Stewart, Kolasch & Birch, LLP

(57) ABSTRACT

A battery fastening apparatus and a portable terminal using the same includes a case an exterior and having a battery seating portion formed on a side so as to be exposed to a surface of the case. A battery is seated on the battery seating portion. A locking knob has a latching protrusion protruding into the battery seating portion so that the battery remains fastened to the battery seating portion. The locking knob is partially exposed to an outside of the case and supported by an elastic member so that the latching protrusion engages with the battery. A stopping lever limits movement of the locking knob when the latching protrusion engages the battery. The battery fastening apparatus prevents the battery from unintentionally detaching from the body of the terminal during operation.

10 Claims, 5 Drawing Sheets

BATTERY FASTENING APPARATUS AND PORTABLE TERMINAL USING THE SAME

BACKGROUND OF THE INVENTION

1. Field of the Invention

The present invention relates to a portable terminal, and more particularly to a battery fastening apparatus adapted to fasten a battery, which supplies a portable terminal with power, to the body of the terminal.

2. Description of the Prior Art

As generally known in the art, portable terminals include cellular phones, which are mainly used for voice communication; PDA's, which are mainly used as electronic organizers; smart phones, which are used as both telephones and electronic organizers; and PMCs (portable multimedia centers) or PMPs (portable multimedia players), which can play mobile images. Portable terminals are supplied with power by using a battery so that they can be used while being carried.

FIG. 1 shows the construction of a folder-type portable terminal, from behind, according to the prior art. As shown, the portable terminal includes a body 1 and a display unit 3 connected to an end of the body 1 via a hinge unit 5. The display unit 3 is adapted to fold on and unfold from the body 1 (opening/closing operation). Depending on the type of the hinge unit 5, the display unit 3 may be adapted to rotate left/right from the front of the body 1.

The body 1 generally has a battery 7 positioned on its rear surface. The battery 7 supplies the portable terminal with power necessary for operation. A battery knob 9 is used to maintain the battery 7 mounted on the body 1 and, if necessary, remove the battery 7 from the body 1.

Particularly, the battery knob 9 fastens the battery 7 to the body 1 and, when moved along the arrow shown in FIG. 1, releases the battery 7. In the drawing, reference numeral 11 refers to an antenna.

However, the conventional portable terminal has the following problems.

The portable terminal, which is supplied with power from the battery 7, is turned on/off by a power button. When the battery 7 is suddenly removed from the body 1 during use, due to a user's carelessness or unexpected external force, the portable terminal inevitably stops operating. This means that any data, which has not been saved, is lost permanently. Such a loss of working data may be worse in the case of a portable terminal, which surpasses a telephone and an electronic organizer up to a computer level.

In addition, if power is interrupted by sudden separation of the battery 7 from the body 1 while the terminal is still turned on, the resulting electric shock may damage internal components or even erase stored data.

SUMMARY OF THE INVENTION

Accordingly, the present invention has been made to solve the above-mentioned problems occurring in the prior art, and an object of the present invention is to provide an apparatus for fastening a battery to a portable terminal so that the battery is not separated from the terminal unintentionally.

In order to accomplish this object, there is provided a battery fastening apparatus for a portable terminal, including a case for defining an exterior, the case having a battery seating portion formed on a side so as to be exposed to a surface of the case, a battery being seated on the battery seating portion; a locking knob having a latching protrusion protruding into the battery seating portion so that the battery remains fastened to the battery seating portion, the locking knob being partially exposed to an outside of the case and supported by an elastic member in such a direction that the latching protrusion engages with the battery; and a stopping lever for limiting movement of the locking knob when the latching protrusion of the locking knob engages with the battery.

In accordance with another aspect of the present invention, there is provided a portable terminal including a case having a battery seating portion formed on a surface; a battery adapted to attach to and detach from the battery seating portion; a first retaining portion for elastically fastening the battery when the battery is seated on the battery seating portion; and a second retaining portion for controlling attachment and detachment of the battery by controlling movement of the first retaining portion.

The battery fastening apparatus for a portable terminal according to the present invention, which is constructed as above, prevents the battery from unintentionally detaching from the body of the terminal during operation, for example, due to the user's carelessness.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
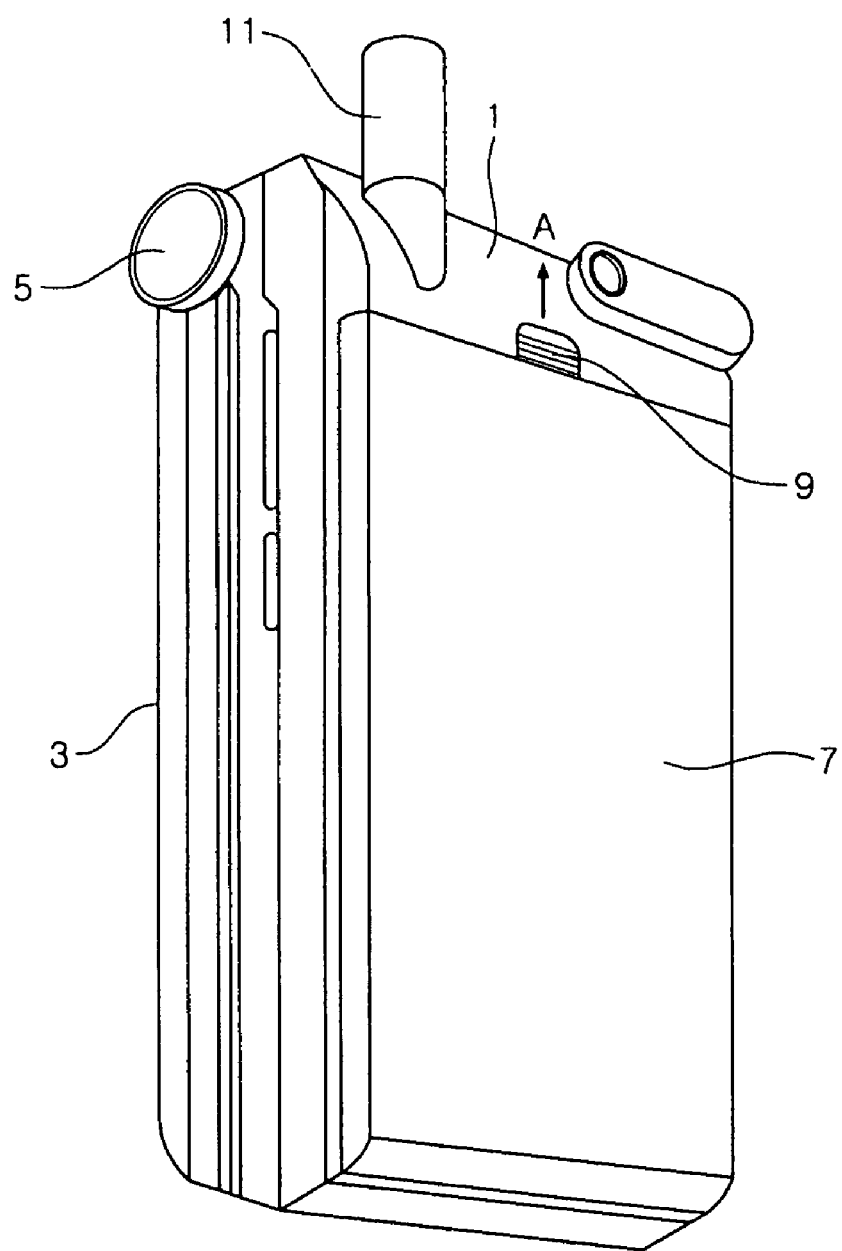
FIG. 1 is a perspective view showing the construction of a portable terminal, from behind, according to the prior art.

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 2:
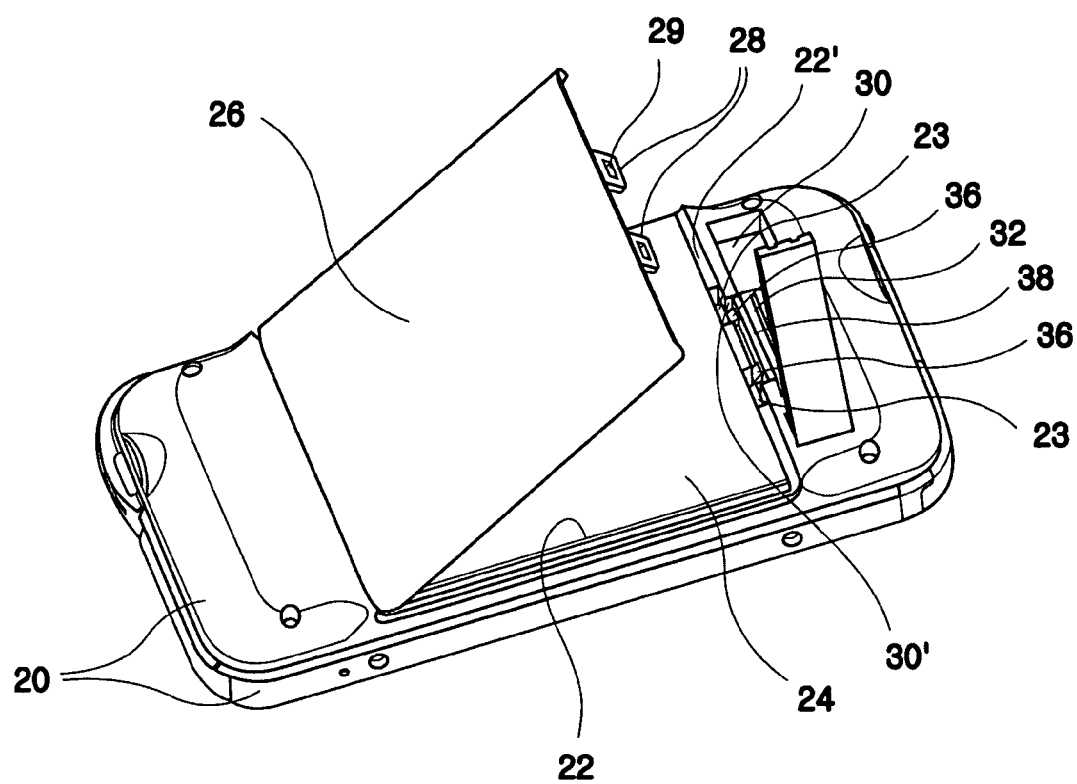
FIG. 2 is a perspective view showing a portable terminal equipped with a battery fastening apparatus according to a preferred embodiment of the present invention.
Figure 3:
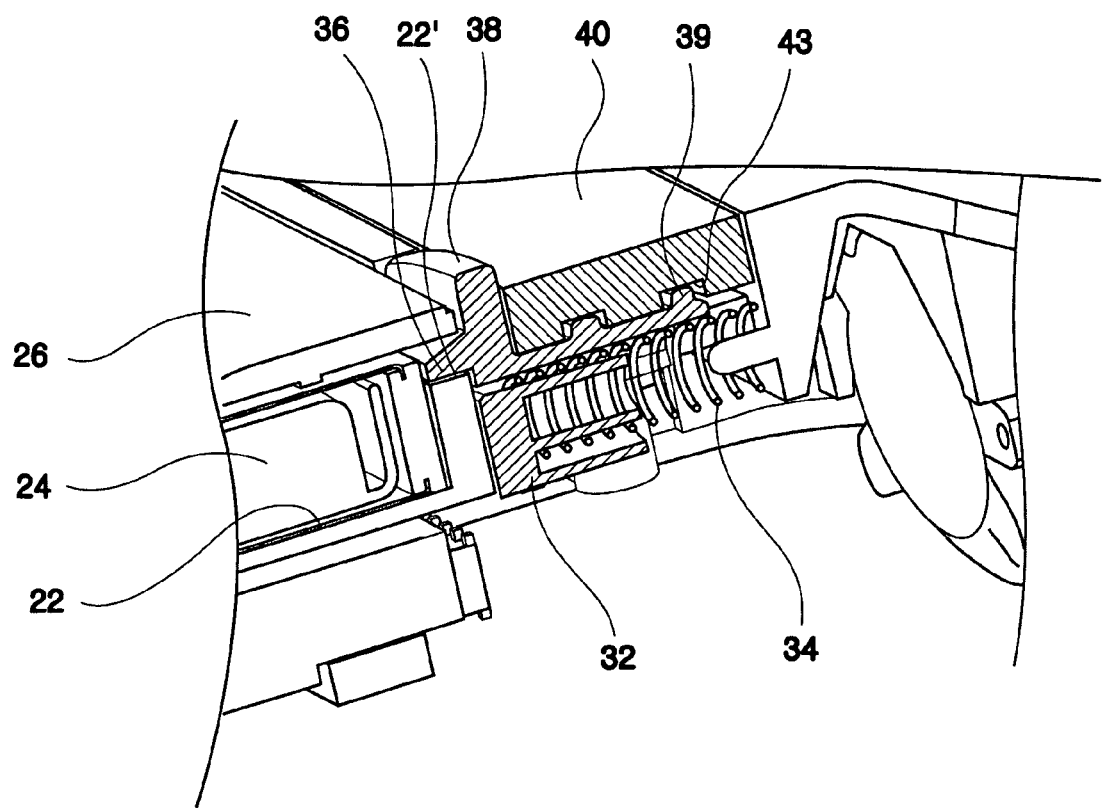
FIG. 3 is a partially-broken perspective view showing major components of a battery fastening apparatus according to an embodiment of the present invention.

FIG. 2 is a perspective view showing a portable terminal equipped with a battery fastening apparatus according to a preferred embodiment of the present invention, and FIG. 3 is a partially-broken perspective view showing major components of the battery fastening apparatus.

As shown in the drawings, a case 20 defines the exterior of a portable terminal equipped with a battery fastening apparatus according to an embodiment of the present invention. The case 20 has the shape of a slim hexahedron. One side of the case 20 is dented so as to define a battery seating portion 22. In general, the battery seating portion 22 is positioned on the rear surface of the case 20. Preferably, a seating step 22' is formed along the edge of the battery seating portion 22. The seating step 22' is not necessarily formed along the entire battery seating portion 22. The seating step 22' has an insertion hole 23 formed thereon so as to correspond to a communication portion 30' of a recess 30 (described later). A latching rib 28 (described later) is inserted into the insertion hole 23. A battery 24 is seated on the battery seating portion 22 and supplies the portable terminal with power.

The battery seating portion 22, on which the battery 24 is seated, is exposed/covered by a battery cover 26. If necessary, the outer surface of the battery 24 may be partially exposed to the outside, without using the battery cover 26. The battery cover 26 has a latching piece (not shown) formed on one end thereof so as to engage with one side of the case 20 in a position corresponding to the edge of the battery seating portion 22.

The battery cover 26 has a latching rib 28 formed on the other end thereof so as to extend in a direction perpendicular to the end. The latching rib 28 has a latching hole 29 formed thereon. The latching rib 28 is positioned so as to correspond to the insertion hole 23, which is formed on the seating step 22'. When the battery 24 is directly seated on the battery seating portion 22 without using the battery cover 26, the latching hole 29 is formed on the battery 24 itself without forming the seating step 22'.

The case 20 has a recess 30 formed on its rear surface so as to correspond to the latching rib 28 of the battery cover 26. The recess 30 is elongated along an end of the battery seating portion 22. The recess 30 and the battery seating portion 22 communicate with each other via the communication portion 30'. It is to be noted that the bottom portions of the recess 30 and the battery seating portion 22 do not fully communicate with each other via the communication portion 30'. For example, the communication portion 30' is blocked up to a predetermined height by the seating step 22'.

The recess 30 is provided with a locking knob 32 in such a manner that the locking knob 32 is partially exposed to the recess 30. The locking knob 32 is designed so that it is not forced into the recess 30 unintentionally. The locking knob 32 is supported by a spring 34 inside the case 20. Due to the spring 34, the locking knob 32 tends to move towards the battery seating portion 22.

The locking knob 32 has a latching protrusion 36 extending towards the battery seating portion 22. The latching protrusion 36 is positioned so as to correspond to the latching rib 28 of the battery cover 26. When the locking knob 32 is pushed towards the battery seating portion 22 by the spring 34, the latching protrusion 36 is positioned in the insertion hole 23 and, when the battery cover 26 covers the battery seating portion 22, the latching protrusion 36 engages with the latching hole 29 of the latching rib 28. A portion of the latching protrusion 36, which is exposed to the outside of the battery seating portion 22, is slanted towards the leading end. This is for the purpose of guiding the latching rib 28 of the battery cover 26 so that the locking knob 32 can move against the elastic force from the spring 34.

The locking knob 32 has a handle 38 formed so as to move between the communication portion 30' and the recess 30. when the locking knob 32 is pushed by the spring 34 so that the latching protrusion 36 is positioned in the insertion hole 23, the handle 38 is positioned on the communication portion 30'. Preferably, the handle 38 slightly protrudes upwards from the surface of the case 30.

A fixing protrusion 39 is formed on a surface of the locking knob 32, which is positioned inside the recess 30. The fixing protrusion 39 extends a predetermined distance in a direction perpendicular to the movement direction of the locking knob 32. Although there are two fixing protrusions 39 in the present embodiment, one or more than two fixing protrusions 39 may be provided.

A stopping lever 40 is positioned in the recess 30. Particularly, the stopping lever 40 is connected to an end of the recess 30 by a hinge unit 42 so as to rotate about the hinge unit 42 in such a manner that the free end of the stopping lever 40 is positioned between the inside and outside of the recess 30. When seated on the recess 30, the stopping lever 40 is not supposed to rotate about the hinge unit 42 unintentionally. To this end, the hinge unit 42 may be designed so that its rotation is limited. Alternatively, the stopper lever 40 may be designed so that it snaps into the recess 30 and does not detach unintentionally.

The stopping lever 40 has a length smaller than that of the recess 30, so that the user can place his finger into the recess 30 and pull out the free end of the stopping lever 40.

The stopping lever 40 has a fixing hole 43 formed thereon so that the fixing protrusion 39 is seated thereon. The fixing hole 43 extends in the longitudinal direction of the stopping lever 40, particularly, the extension direction of the fixing protrusion 39. When the stopping lever 40 is seated on the recess 30, the fixing protrusion 39 is seated into the fixing hole 43. In this manner, the stopping lever 40 prevents the locking knob 32 from moving.

The operation of the battery fastening apparatus for a portable terminal according to the present invention, which is constructed as above, will now be described in detail.

Figure 4:
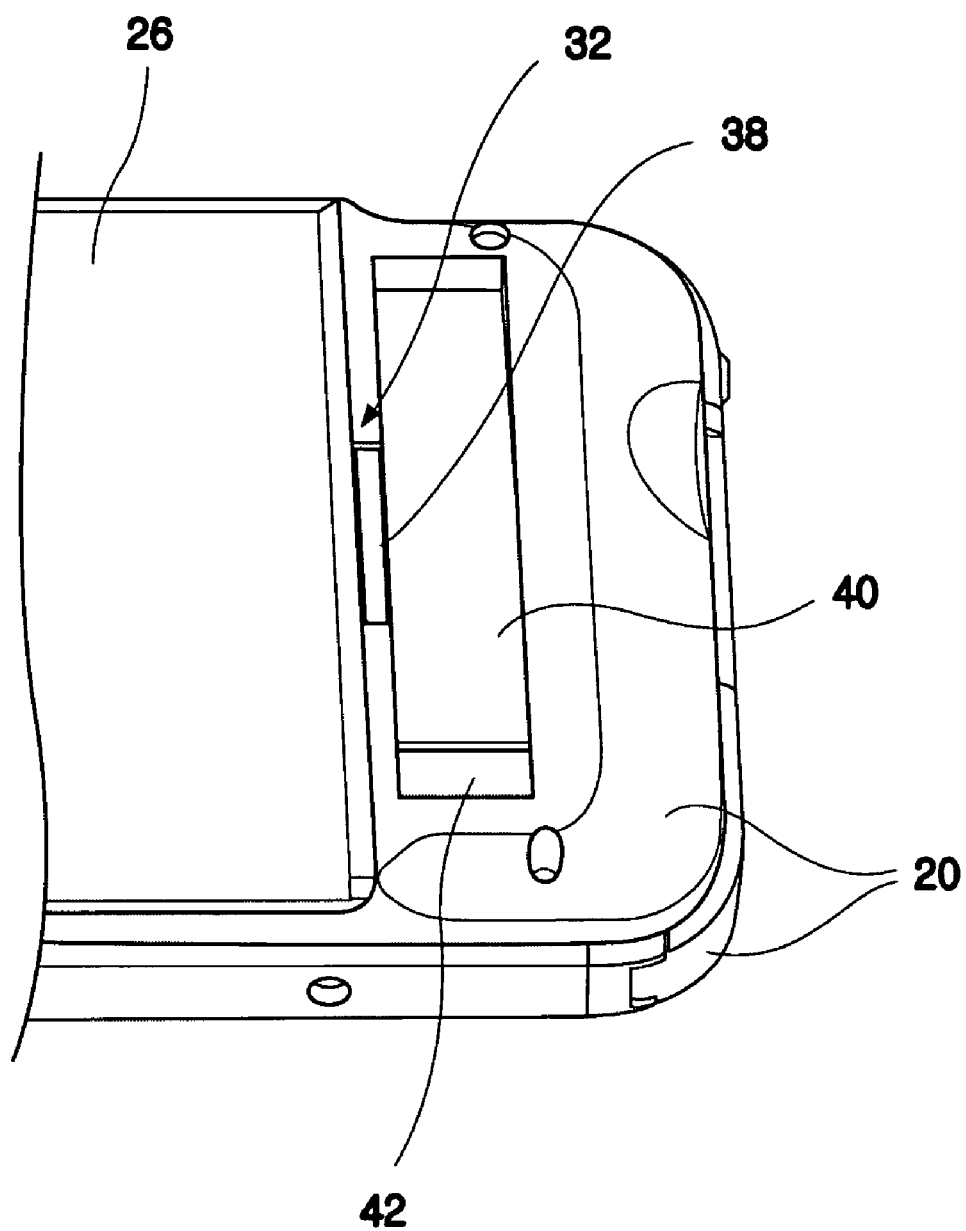
FIG. 4 shows the operation of a battery fastening apparatus, when a battery is seated on a battery seating portion, according to an embodiment of the present invention.
Figure 5:
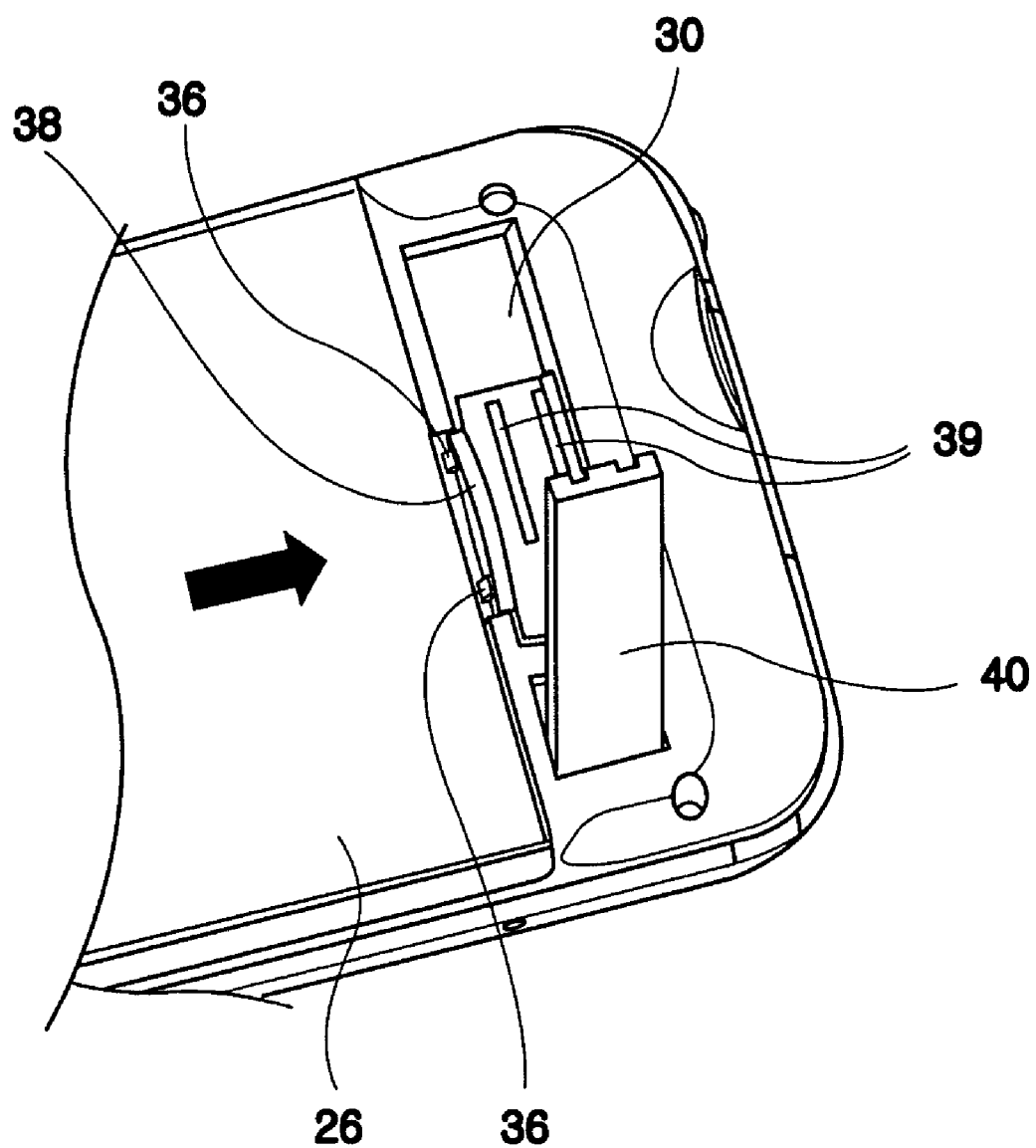
FIG. 5 shows the operation of a battery fastening apparatus, when a stopping lever is separated from a recess and a locking knob is moved, according to an embodiment of the present invention.

FIG. 4 shows a state wherein the battery 24 is seated on the battery seating portion 22 by the battery fastening apparatus according to the present invention, and FIG. 5 shows the operation for separating the stopping lever 40 from the recess 30 and removing the battery 24 from the battery seating portion 22.

When the battery 24 is seated on the battery seating portion 22, the battery cover 26 covers the battery seating portion 22. Particularly, the latching piece, which is formed on an end of the battery cover 26, is fitted to the case, and the latching rib 28 is inserted into the insertion hole 23 of the seating step 22'. In addition, the latching protrusion 36 of the locking knob 32 is inserted into the latching hole 29 of the latching rib 28, so that the battery cover 26 is fastened to the case 20.

As the stopping lever 40 is seated into the recess 30, the fixing protrusion 39 of the locking knob 32 is seated into the fixing hole 43 of the stopping lever 40 and remains stationary. As a result, the locking knob 32 is not moved due to the user's carelessness or unexpected external impact.

When the user separates the free end of the stopping lever 40 from the recess 30 and rotates it about the hinge unit 42 of the stopping lever 40, the fixing protrusion 39 is released from the fixing hole 43. Then, the locking knob 32 is movable.

Particularly, when the user presses the handle 38 so that the locking knob 32 is moved along the arrow shown in FIG. 5, the locking knob 32 moves against the elastic force from the spring 34. As a result, the latching protrusion 36 of the locking knob 32 is released from the latching hole 29 of the latching rib 28. In this condition, the latching rib 28 of the battery cover 26 does not engage with the locking knob 32 any longer and is separable from the case 20. After separating the battery cover 26 from the case 20, the battery 24 is removable from the battery seating portion 22.

If the locking knob 32 is no longer subjected to the force acting along the arrow shown in FIG. 5, the locking knob 32 returns to the original position due to the restoration force from the spring 34. Particularly, the handle 38 is positioned on the communication portion 30', and the latching protrusion 36 protrudes into the battery seating portion 22.

In this state, the battery 24 is replaced on the battery seating portion 22, and the battery cover 26 is mounted. Particularly, the latching piece of the battery cover 26 is inserted into one side of the case 30, and the latching rib 28 is inserted into the insertion hole 23.

After inserting the latching rib 28 into the insertion hole 23, the leading end of the latching rib 28 is guided along the slanted surface of the latching protrusion 36 of the locking knob 32, which then moves against the elastic force from the spring 34.

After passing the leading end of the latching protrusion 36, the latching rib 28 is completely inserted into the insertion hole 23. In addition, the locking knob 32 is moved in a direction opposite to the arrow shown in FIG. 5 by the elastic force from the spring 34. As a result, the latching protrusion 36 engages with the latching hole 29 of the latching rib 28. In this condition, the battery cover 26 engages with the locking knob 32 and is not separated from the case 20 unintentionally.

Subsequently, the stopping lever 40 is seated into the recess 30 so that the fixing protrusion 39 of the locking knob 32 is seated into the fixing hole 43 of the stopping lever 40. Then, the locking knob 32 is fixed by the stopping lever 40 without moving unintentionally.

As mentioned above, the battery fastening apparatus for a portable terminal according to the present invention is advantageous in that a stopping lever is used to limit the movement of the locking knob, which fastens the battery or battery cover to the battery seating portion. As a result, the locking knob is not operated unintentionally due to the user's carelessness or unexpected external impact. This means that the battery is not unintentionally separated from the battery seating portion. This prevents unwanted interruption of power supply and loss of working data.

Although a preferred embodiment of the present invention has been described for illustrative purposes, those skilled in the art will appreciate that various modifications, additions and substitutions are possible, without departing from the scope and spirit of the invention as disclosed in the accompanying claims.

For example, although the stopping lever 40 is adapted to rotate about the hinge unit 42 on one side in the illustrated embodiment, the stopping lever 40 may be adapted to linearly move inside the recess 30 so that the fixing protrusion 39 is positioned in the fixing hole 43.

In addition, as briefly mentioned above, the battery 24 may be directly fastened by the locking knob 32, without using the battery cover 26, and mounted on the battery mounting portion 22.

Furthermore, the present invention is applicable to all types of portable terminals, including cellular phones, PDAs, smart phones, PMCs, and PMPs.

What is claimed is:

1. A portable terminal comprising: a case having a battery seating portion formed on a surface; a battery adapted to attach to and detach from the battery seating portion; a first retaining portion for elastically fastening the battery when the battery is seated on the battery seating portion; and a second retaining portion for controlling attachment and detachment of the battery by controlling movement of the first retaining portion, wherein the first retaining portion is a locking knob having a latching protrusion protruding into the battery seating portion so that the battery remains fastened to the battery seating portion, the locking knob being partially exposed to an outside of the case and supported by an elastic member in such a direction that the latching protrusion engages with the battery, and the second retaining portion is a stopping lever adapted to limit movement of the locking knob when the latching protrusion of the locking knob engages with the battery, wherein the locking knob is seated into a recess formed on a surface of the case, the surface being adjacent to the battery seating portion, and has a handle protruding from the surface of the case, the handle being selectively positioned in the recess or on a communication portion formed between the recess and the battery mounting portion.

2. The portable terminal as claimed in claim 1, further comprising a battery cover for covering the battery seating portion when the battery is seated on the battery seating portion, the battery cover having a latching piece formed on an end and a latching rib formed on a different end, the latching piece being inserted into the case, the latching rib being fastened to the latching protrusion of the locking knob.

3. The portable terminal as claimed in claim 1, wherein the stopping lever has an end, a hinge unit positioned on the end, and a free end adapted to rotate about the hinge unit so as to move between an inside and an outside of a recess formed on a surface of the case, the surface being adjacent to the battery seating portion.

4. The portable terminal as claimed in claim 3, wherein the stopping lever has a fixing hole formed in a longitudinal direction of the stopping lever, and the locking knob has a fixing protrusion adapted to be seated into the fixing hole when the stopping lever is seated into the recess.

5. The portable terminal as claimed in claim 4, wherein the fixing hole and the fixing protrusion are formed in a direction perpendicular to a movement direction of the locking knob.

6. The portable terminal as claimed in claim 1, wherein the battery has a latching hole formed so that the latching protrusion of the locking knob is selectively seated into the latching hole and the battery is exposed to the outside of the case when seated on the battery seating portion.

7. A portable terminal, comprising: a case having a battery seating portion formed on a surface; a cover attaching to the case, the cover having a projection extending from an upper edge; a first retaining portion engaging the projection, the first retaining portion movable in a first direction toward the projection and a second direction away from the projection; and a second retaining portion having a first position preventing the first retaining portion from moving in the second direction and a second position allowing the first retaining portion to move in the second direction, wherein the second retaining portion moves from the first position to the second position by rotating about an axis that is perpendicular to the upper edge of the cover.

8. The portable terminal of claim 7, wherein the second retaining portion overlies the first retaining portion.

9. The portable terminal of claim 8, further comprising:
a fixing protrusion on the first retaining portion; and
a fixing hole in the second retaining portion engaging the fixing protrusion.

10. The portable terminal of claim 7, further comprising a spring biasing the first retaining portion in the first direction.

* * * * *